No. 626,525. Patented June 6, 1899.
J. BROUGH.
BICYCLE DRIVING GEAR.
(Application filed Jan. 14, 1898.)
(No Model.)
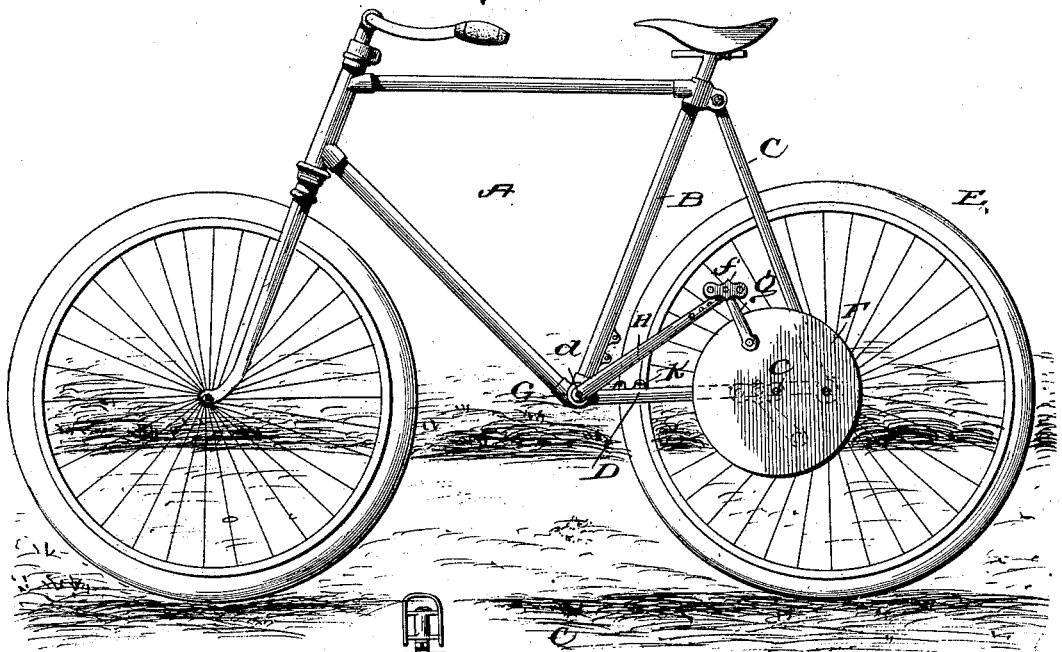
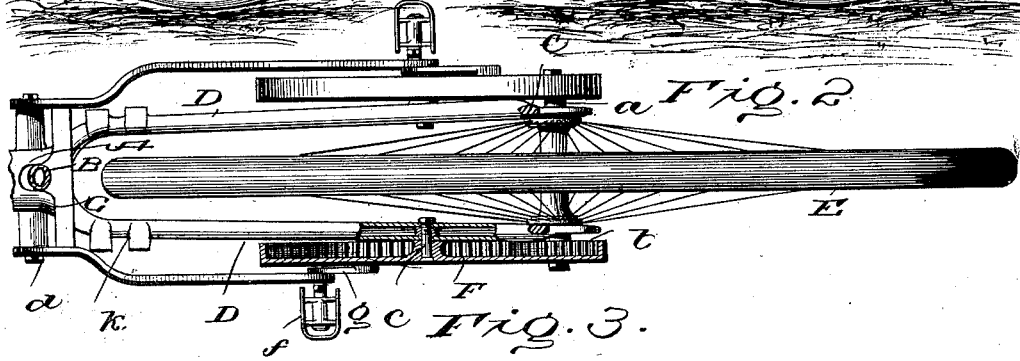
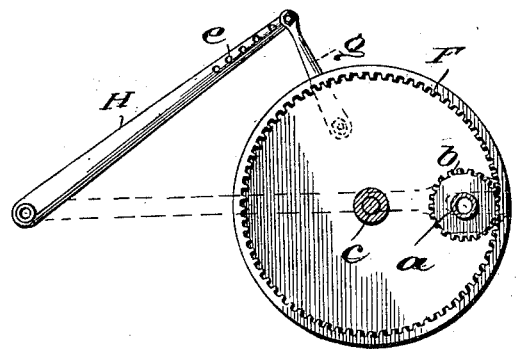
Witnesses:
Inventor:
John Brough
by R.S. & A.B. Lacey
his Attorneys

UNITED STATES PATENT OFFICE.

JOHN BROUGH, OF MANCHESTER, CONNECTICUT.

BICYCLE DRIVING-GEAR.

SPECIFICATION forming part of Letters Patent No. 626,525, dated June 6, 1899.

Application filed January 14, 1898. Serial No. 666,667. (No model.)

*To all whom it may concern:*

Be it known that I, JOHN BROUGH, a citizen of the United States, residing at Manchester, in the county of Hartford and State of Connecticut, have invented certain new and useful Improvements in Bicycle Driving-Gears; and I do hereby declare the following to be a full, clear, and exact description of the invention, such as will enable others skilled in the art to which it appertains to make and use the same.

This invention relates to improvements in drive-gearing for bicycles; and the objects are to provide a simple, powerful, and effective gearing of the chainless type and improved means for mounting the same upon the frame of the bicycle, and also to provide a gearing capable of being readily and quickly applied and removed for cleaning or repairs.

With the accomplishment of these ends in view the invention consists in certain novel features of construction, combination, and arrangement of parts, which will be hereinafter more fully described, and specifically set forth in the appended claim.

In the accompanying drawings, forming a part of this specification, Figure 1 is a side elevational view of a bicycle embodying my invention. Fig. 2 is a top plan view of the same with parts shown in section. Fig. 3 is an enlarged detail view of the gearing, looking toward the inner side of the internal gear.

Referring now more particularly to the drawings, wherein like letters of reference designate corresponding parts throughout the several views, A represents the frame of a bicycle; B, the seat-post thereof; C, the rear forks, and D the rear-fork stays or lower runs.

E represents the rear wheel, which is rigidly mounted on an axle $a$, projecting laterally beyond the frame and carrying at each end a pinion $b$. These pinions mesh with internal gear-wheels F, mounted to revolve on spindles $c$, detachably secured to the back-fork stays in advance of said axle. By simply detaching the spindles the internal gear-wheels may be removed for cleaning, repairs, or substitution of other gear-wheels.

Pivoted at their lower front ends to a bolt or spindle $d$, projecting from the hanger G, are pedal-levers H, each provided at its rear end with a series of orifices $e$, in either one of which the axle of a pedal $f$ may be fitted to adjustably secure the latter thereto. A crank-arm $g$ connects this axle with a wrist-pin on the internal gear-wheel. In operation the levers are adapted to have a rocking movement and to be alternately depressed by the rider, whereby power will be communicated through the medium of the crank-arms to the internal gears, which will be rotated forwardly and in turn rotate the pinions, and consequently the rear wheel, forwardly. In order to permit of the adjustment of the pedal-levers, the seat-post tube and rear-fork stays are provided with a series of apertured ears or projections $h$, to either one of which the front ends of said levers may be pivotally connected. By shifting the pivotal points of the levers in this manner and adjusting the axles of the pedals correspondingly it will be seen that said levers may be raised and lowered and the distance between the said pivotal points varied to suit the reach of the rider.

From the foregoing description, taken in connection with the drawings, it will be seen that the invention provides a simple and effective construction of bicycle-gearing that is applicable to the diamond-frame and chain-driven bicycles now in common use without altering the construction of the same in any particular, it being only necessary to remove the chain-gearing and substitute my improved chainless gearing in lieu thereof. It will also be seen that by the particular construction and arrangement of parts I am enabled to provide a drive-gearing embodying but two gears—the drive-gear and axle-pinion—instead of three ordinarily employed and which may be operated without the necessity of the rider pedaling backward.

Having thus fully described my invention, what I claim as new, and desire to secure by Letters Patent, is—

In a safety-bicycle, the combination of a frame provided with a pivot pin or bolt at the hanger and a series of ears or bearing projections on the lower end of the seat-post and front end of one of the back-fork stays thereof, a rear-wheel axle carrying a pinion, drive-gear meshing with the pinion and mounted on a spindle projecting from said back-fork stay, a pedal-lever adapted to be pivoted to the pivot-pin or either one of the said ears or bearing projections and carrying a pedal at its rear end, and a crank-arm connecting the rear end of the pedal and drive-gear, substantially as described.

In testimony whereof I affix my signature in presence of two witnesses.

JOHN BROUGH.

Witnesses:
GLADYS L. THOMPSON,
C. C. HINES.